UNITED STATES PATENT OFFICE.

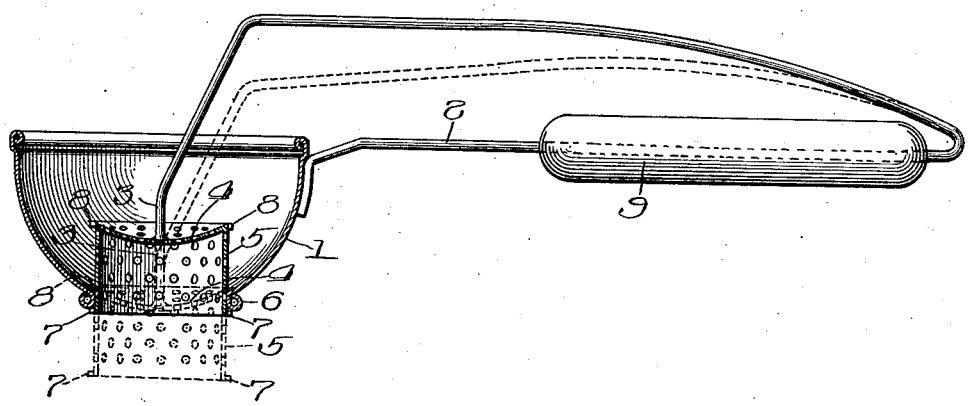
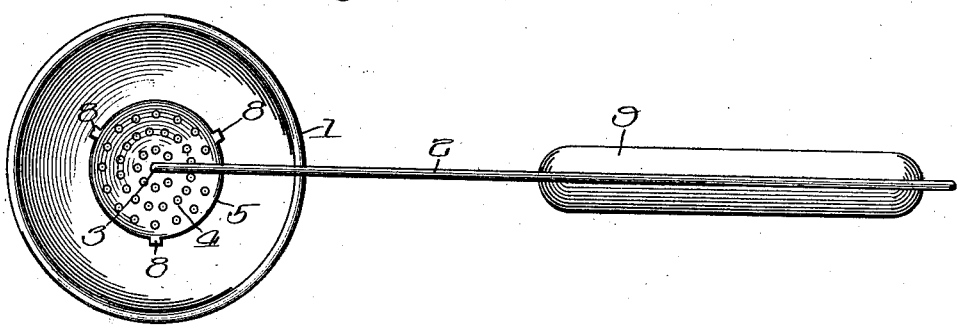
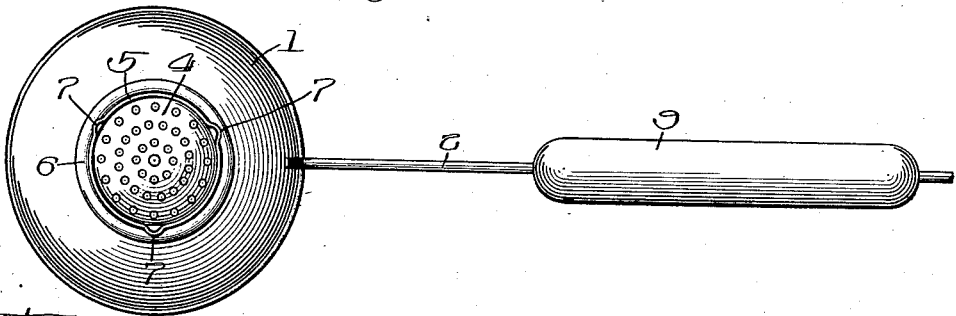

PETER G. JACOBSON, OF CHICAGO, ILLINOIS.

STRAINER.

1,073,081.  Specification of Letters Patent.  Patented Sept. 9, 1913.

Application filed April 3, 1913. Serial No. 758,680.

*To all whom it may concern:*

Be it known that I, PETER G. JACOBSON, citizen of the United States, residing at Chicago, in the county of Cook and State of Illinois, have invented a certain new and useful Improvement in Strainers, of which the following is a full, clear, concise, and exact description, reference being had to the accompanying drawings, forming a part of this specification.

My invention relates to strainers and resides in such a structure having two relatively movable wall portions one at least of which is apertured to constitute a straining element and both of which are in engagement during their relative movement whereby coffee grounds, tea leaves, or other matter which is to be strained out of liquid is dislodged from the straining element to clear the way for the free flow of the liquid.

In the preferred embodiment of the invention, the straining element is in the form of a perforated cylinder having a cap that is also desirably perforated, the cylinder being free of closure at its lower end, this cylinder being workable back and forth through the bottom of a cup that is otherwise desirably imperforate.

I will explain my invention more fully by reference to the accompanying drawing in which—

Figure 1 is a sectional elevation of the preferred construction; Fig. 2 is a plan view; and Fig. 3 is a bottom view.

Like parts are indicated by similar characters of reference throughout the different figures.

The strainer includes a cup 1 of metal or other suitable material to which is secured one end of a spring loop so shaped and disposed as to constitute a handle. The other end of the loop 2 has a continuation 3 that is disposed axially of the cup and which is attached to the cap 4 (preferably perforated) of a perforated cylinder 5, the cylinder also being co-axial with the cup. The cup is provided with an opening in its bottom which is bordered by a curled flange 6 which has close sliding or scraping fit with the cylinder 5. Lugs 7 are provided at the lower end of the cylinder, and lugs 8 at the upper end thereof, the curled flange 6 being interposed between the lugs upon the ends of the cylinder, whereby engagement between the cylindrical wall element of the strainer and the imperforate wall element of the strainer is never broken as the cylindrical element is moved back and forth.

The tension of the loop element 2 is such that it forces the cylinder normally to occupy an elevated position in which the lugs 7 engage the flange 6. With this normal relationship of the parts, the device is adapted to its use, but as such use continues the matter which is to be strained out, such as coffee grounds or tea leaves, might collect about the cylinder to close its strainer openings, thereby to impede the progress of the coffee, tea, or other liquid which is being directed through the strainer to a receptacle below. The material gathered about the straining cylinder is dislodged by pressing the upper branch of the loop handle toward the lower until the lugs 8 strike the curled flange 6, the flange scraping the gathered material from the cylinder whose openings are again uncovered to permit the liquid again freely to flow through the strainer, contracting pressure having been removed from the handle when the cylinder was fully depressed to permit the cylinder automatically to restore.

A grip 9 is supplied to the handle to facilitate the contraction thereof and the holding of the utensil.

The cylindrical element 4 constitutes the preferred form of space inclosing wall that is in movable relation to the companion wall element but I do not wish to be limited to such cylindrical formation in all embodiments of the invention.

While I have herein shown and particularly described the preferred embodiment of my invention I do not wish to be limited to the precise details of construction shown as changes may readily be made without departing from the spirit of the invention.

Having thus described the invention I claim as new and desire to secure by Letters Patent the following:—

1. A strainer having a substantially imperforate cupped wall portion provided with an opening at its bottom; a cylindrical wall portion reciprocable through said opening and provided with holes to constitute it a straining element and which cylindrical wall portion has a perforated cap; and a handle including a spring loop in its formation, one side of the loop being secured to the first aforesaid wall portion and the other side of the loop to the cylindrical wall portion, the handle normally operating to hold the straining element within the cupped wall portion.

2. A strainer having a cupped wall portion provided with an opening at its bottom; a space inclosing wall portion reciprocable through said opening and provided with holes to constitute it a straining element; and a handle including a spring loop in its formation, one side of the loop being secured to the first aforesaid wall portion and the other side of the loop to the second aforesaid wall portion, the handle normally operating to hold the straining element within the cupped wall portion.

3. A strainer having a substantially imperforate cupped wall portion provided with an opening at its bottom; a cylindrical wall portion reciprocable through said opening and provided with holes to constitute it a straining element and which cylindrical wall portion has a perforated cap; and means for effecting relative reciprocal movement between said wall portions.

4. A strainer having a cupped wall portion provided with an opening at its bottom; a space inclosing wall portion reciprocable through said opening and provided with holes to constitute it a straining element; and a spring device normally projecting the strainer within the cup space.

5. A strainer having a substantially imperforate cupped wall portion provided with an opening at its bottom; and a cylindrical wall portion reciprocable through said opening and provided with holes to constitute it a straining element and which cylindrical wall portion has a perforated cap.

6. A strainer having a cupped wall portion provided with an opening at its bottom; a space inclosing wall portion reciprocable through said opening and provided with holes to constitute it a straining element; and a handle having a spring portion normally projecting the strainer within the cup space and operable to move the strainer outwardly from the cup.

In witness whereof, I hereunto subscribe my name this twenty-fifth day of February A. D., 1913.

PETER G. JACOBSON.

Witnesses:
E. L. White,
G. L. Cragg.

---

Copies of this patent may be obtained for five cents each, by addressing the "Commissioner of Patents, Washington, D. C."